Figure 1:
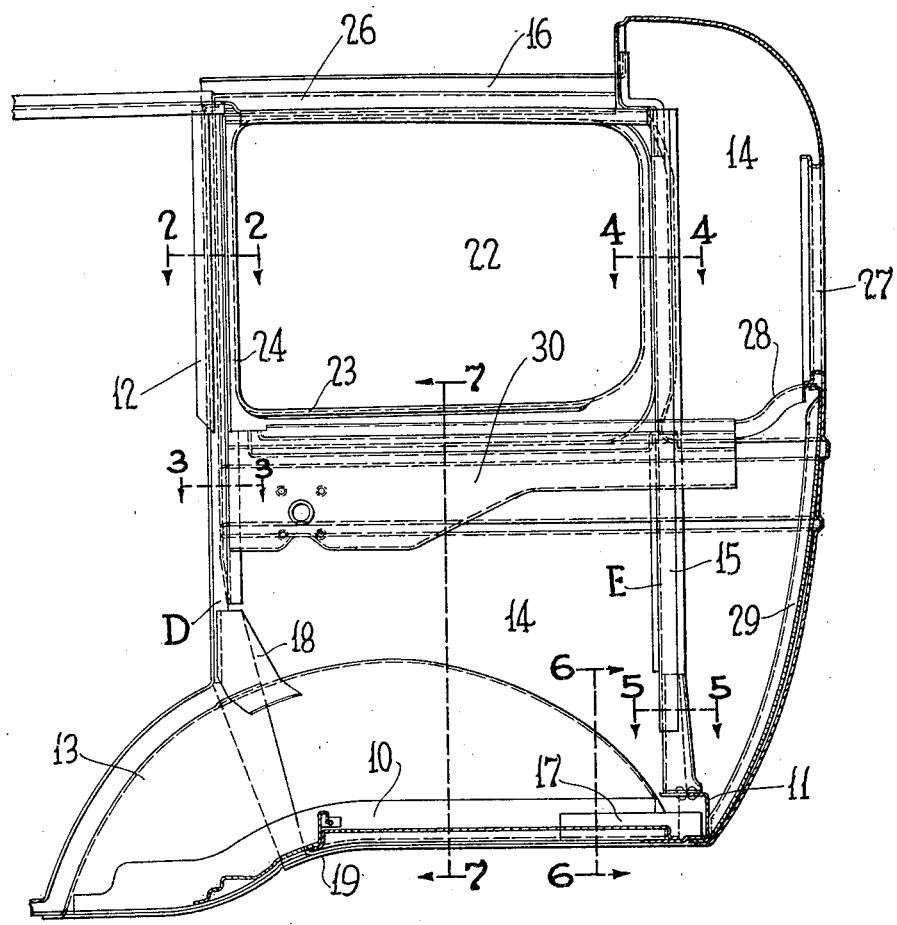

July 19, 1932. J. LEDWINKA 1,867,851
VEHICLE BODY TONNEAU CONSTRUCTION UNIT
Original Filed Jan. 9, 1926 2 Sheets-Sheet 1

INVENTOR.
JOSEPH LEDWINKA
BY
ATTORNEY.

July 19, 1932.   J. LEDWINKA   1,867,851
VEHICLE BODY TONNEAU CONSTRUCTION UNIT
Original Filed Jan. 9, 1926   2 Sheets-Sheet 2
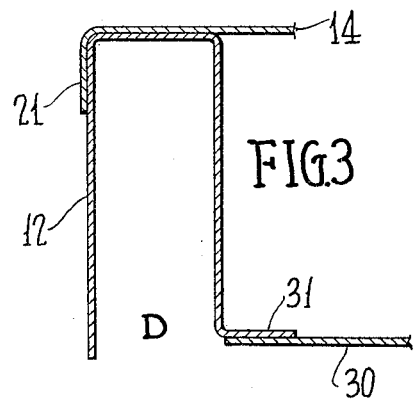
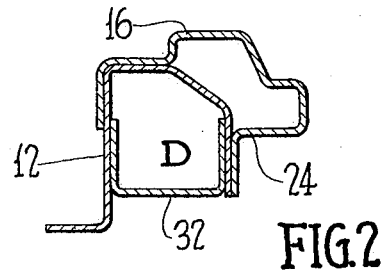
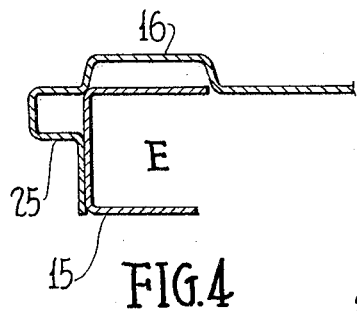
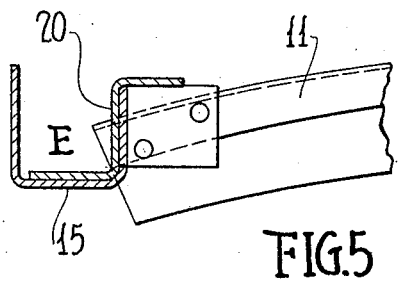
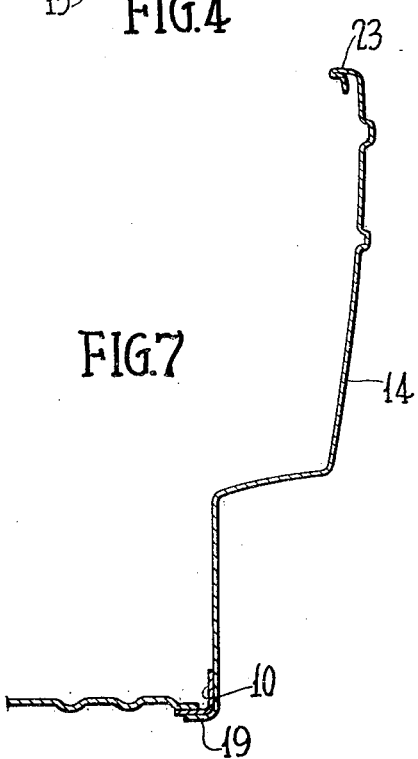
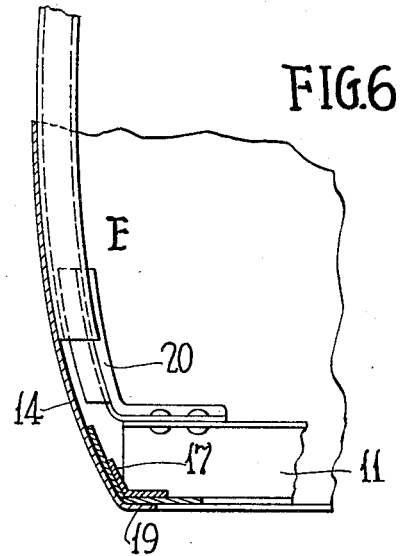
INVENTOR.
JOSEPH LEDWINKA.
BY
ATTORNEY.

Patented July 19, 1932

1,867,851

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY TONNEAU CONSTRUCTION UNIT

Original application filed January 9, 1926, Serial No. 80,166, and in Canada January 7, 1927. Divided and this application filed March 25, 1931. Serial No. 525,056.

This invention relates to automobile bodies of closed design, known as the sedan type, and relates particularly to structures of this type which are built up of sheet steel stamped or otherwise formed into the desired form or contour and rigidly secured together.

This application is a division of application Serial No. 80,166, filed January 9, 1926.

The object of the invention is to provide a closed automobile body which is at once simple, strong and rugged and which can be easily and economically manufactured.

A further object of the invention is to provide a closed automobile body construction in which the component stampings used in the completed body are joined together to form several major units, which units, as such, are combined and assembled to form the completed body, whereby the cost of manufacturing is reduced and the speed of production increased.

A still further object is to provide a body construction wherein the same may be conveniently and economically shipped from the place of manufacture to that of final assembly.

A still further object is the provision of an improved manner of securing the base of the rear body post to the body underframework.

Other objects of the invention will appear more fully hereinafter.

The invention consists substantially in the construction, combination, location and relative arrangement of parts all as will be more fully hereinafter set forth as shown in the accompanying drawings and finally pointed out in the appended claims.

Referring to the accompanying drawings, Figure 1 is a central longitudinal sectional view of a tonneau unit according to the invention.

Figures 2 to 7, inclusive, are detail sectional views, the sections being taken on the corresponding lines of Fig. 1.

In the drawings in which is represented a preferred embodiment of the invention, the rear or tonneau unit of my improved construction comprises side sills 10, a rear sill 11, a D-post 12 and D-post brackets 13 all of which constitute the frame for the tonneau paneling, designated generally by numeral 14.

Further this unit includes the E-post 15 at the rear of the side windows between the top of which and the D-post 12 extends the section 16 of the tonneau paneling. The tonneau paneling 14 is in this case made up of three sections integrally joined together to constitute in effect a single unitary panel extending from the rear door post on one side of the rear door post on the other side of the body.

The side sills 10 are of angle formation and the rear sill 11 of forwardly facing channel formation. They are joined together by a suitable reinforcing bracket 17 and form the lower supporting structure for the tonneau unit. This lower supporting framework of the tonneau unit is supplemented by the D and E posts indicated at 12 and 15. The structure of the D-post is of channel section, see Figs. 2 and 3. A brace or hinge bracket 18 bridging in vertical direction the lower rear door hinge is secured to the front wall of the channel of the post and extends rearwardly and downwardly and is anchored by welding to the wheel housing formed partly in the tonneau panel 14 and the post D bracket 13, as appears clearly in Fig. 1, where the bracket is shown connected over the joint between tonneau paneling and post D bracket and secured to each.

The D-post, instead of being erected and welded directly upon the side sill, is erected and welded directly upon the post D bracket 13. The tonneau side sill 10 is connected to the body side sill (not shown) through the post D bracket 13 and is of angle cross section as clearly appears in Figs. 6 and 7, and presents inwardly and upwardly, the lower branch being a horizontal inwardly extending flange.

The tonneau paneling 14 is provided along its lower edge with an inturned flange 19 which is in turn secured by welding to the tonneau sills 10 and 11. The forward lower corner of the tonneau paneling is cut on a bias as is shown in Fig. 1 for overlapping joinder with the post D bracket 13.

The E-post 15 is also of channel formation but has its opening presenting rearwardly. This post extends substantially from the top line of the window opening downwardly to a point just above the rear sill 11. Instead of connecting the lower end of this E-post 15 to the wheel housing, as is usually done, in this case the post is connected to the rear sill 11 by an interconnecting bracket member 20 of substantially simple Z cross section throughout its major portion fitted within the channel of the E-post and welded thereto in such manner that the web of this bracket 20 extends downwardly and laterally to overlie the top of the rear sill 11 to which it is rigidly secured as by welding or riveting. This is clearly shown in Figs. 5 and 6.

The tonneau side and back structure is comprised of the tonneau paneling of the car and is formed in one piece as usual, and secured to the tonneau side sills and rear sills as already described. The forward vertical edges of the tonneau paneling are provided with inturned flanges 21 which embrace the forward walls of the D-post 12 (see Fig. 3).

Between the D and E posts the paneling of the tonneau side section immediately adjacent its upper edge 16 which is formed as part of the tonneau side panel stamping is cut away to form a window opening 22. Its margins in the sides of the window opening are flanged inwardly over that part of the window framing constituted by the D and E posts and at the bottom to form the transverse outer window sill rail 23. Those portions which are flanged inwardly over the D and E posts are rabbeted as at 24 and 25 to accommodate the window guide channels. The framing at the top of the window opening is formed principally by a portion of the top rail 26 extending between the D and E posts, together with that portion of the panel 16 extending above the window opening.

The back wall of the tonneau paneling extends upwardly and forwardly to a point just beyond the rear vertical line of the side windows, the forward edge thereof being provided with a transversely extending rabbet for supporting the roof unit. A rear window opening 27 is provided in the back of the tonneau panel in the usual manner.

Extending from the D-post on one side of the body to the D-post on the other and constituting the reinforcing member for the lower flange of the rear window 27 is a reinforcing angle 28. Throughout the major portion of its length this angle member is spaced from the body of the paneling, thus serving not only as a brace for tying together the side and rear of the tonneau, but also as means for attaching upholstery in place. Disposed centrally of the back panel of the tonneau is a vertically extending spare tire carrier brace having its upper end secured to the angle member 28 preferably by welding, and its lower end secured to the bottom of the rear sill 11. The tonneau unit is completed by the addition of a window regulator panel 30 extending between and secured to the posts 12 and 15. Immediately below the window opening 22 for purposes of strength and for attaching this window regulator panel 30 the rear side wall of the channel post 12 is provided with a rearwardly extending flange 31 as shown in Fig. 3. At the side of the window opening the post D is converted into a substantially box section structure (see Fig. 2) by telescopically securing a reinforcing channel 32 within the channel of the post and securing it thereto through the overlapping side walls.

What I claim is:

1. In a pressed metal automobile body, a tonneau assembly including a transversely extending rear sill, a vertically extending rear body post of channel formation presenting rearwardly having its lower end terminating above said rear sill and a bracket member connecting said lower end of said body post with said rear sill.

2. A pressed metal automobile body construction including a tonneau panel, a door post secured to the forward vertical edge thereof, a bracket at the lower edge of said post, said bracket being formed complementally with the lower portion of said tonneau panel, and a hinge bracket having a portion thereof secured to said door post and another portion thereof overlying adjacent portions of said complementally formed bracket and tonneau panel.

3. In a pressed metal automobile body construction a transversely extending rear sill of channel formation presenting forwardly of the body, a vertically extending body post of channel formation presenting rearwardly of the body, and a bracket member connecting the bottom of said body post with the upper wall of said rear sill, said bracket being of substantially Z section.

4. In a vehicle body construction, a tonneau panel, a door post secured to the forward vertical edge thereof, a longitudinally widened base portion secured to the lower end of said post, said base portion and tonneau panel being complementally formed with a wheel housing depression, and a hinge bracket secured to said door post and to the crown of the wheel housing to brace the door post in the region of the hinge mounting.

In testimony whereof I hereunto affix my signature.

JOSEPH LEDWINKA.